United States Patent
Havlir et al.

(10) Patent No.: US 9,619,394 B2
(45) Date of Patent: Apr. 11, 2017

(54) OPERAND CACHE FLUSH, EVICTION, AND CLEAN TECHNIQUES USING HINT INFORMATION AND DIRTY INFORMATION

(71) Applicant: Apple Inc., Cupertino, CA (US)

(72) Inventors: Andrew M. Havlir, Orlando, FL (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/805,124

(22) Filed: Jul. 21, 2015

(65) Prior Publication Data

US 2017/0024323 A1    Jan. 26, 2017

(51) Int. Cl.
| | |
|---|---|
| *G06F 13/00* | (2006.01) |
| *G06F 12/0875* | (2016.01) |
| *G06F 12/0891* | (2016.01) |
| *G06F 9/30* | (2006.01) |
| *G06F 12/0815* | (2016.01) |

(52) U.S. Cl.
CPC ...... *G06F 12/0875* (2013.01); *G06F 9/30098* (2013.01); *G06F 12/0891* (2013.01); *G06F 12/0815* (2013.01); *G06F 2212/452* (2013.01); *G06F 2212/6046* (2013.01)

(58) Field of Classification Search
CPC ............. G06F 12/0875; G06F 12/0891; G06F 9/30098; G06F 2212/452; G06F 9/30141; G06F 12/0815; G06F 2212/6046
USPC .......................... 711/144, 145, 141, 123, 133
See application file for complete search history.

(56) References Cited

U.S. PATENT DOCUMENTS

| | | | |
|---|---|---|---|
| 6,289,417 B1 | 9/2001 | Larri | |
| 6,311,320 B1 * | 10/2001 | Jibbe | ................... G06F 9/45512 717/111 |
| 2005/0289299 A1 | 12/2005 | Nunamaker et al. | |
| 2008/0022044 A1 | 1/2008 | Nunamaker et al. | |
| 2011/0161593 A1 | 6/2011 | Yamazaki | |
| 2012/0047329 A1 | 2/2012 | Goel et al. | |
| 2013/0086364 A1 | 4/2013 | Gschwind et al. | |
| 2013/0159628 A1 | 6/2013 | Choquette et al. | |
| 2013/0246708 A1 | 9/2013 | Ono et al. | |
| 2015/0058572 A1 * | 2/2015 | Olson | ................. G06F 9/30043 711/125 |

(Continued)

FOREIGN PATENT DOCUMENTS

| | | |
|---|---|---|
| EP | 0717359 | 6/1996 |
| TW | 201015318 | 4/2010 |
| WO | 9003001 | 3/1990 |

*Primary Examiner* — Hong Kim
(74) *Attorney, Agent, or Firm* — Meyertons, Hood, Kivlin, Kowert & Goetzel, P.C.

(57) ABSTRACT

An apparatus includes an operand cache for storing operands from a register file for use by execution circuitry. In some embodiments, eviction priority for the operand cache is based on the status of entries (e.g., whether dirty or clean) and the retention priority of entries. In some embodiments, flushes are handled differently based on their retention priority (e.g., low-priority entries may be pre-emptively flushed). In some embodiments, timing for cache clean operations is specified on a per-instruction basis. Disclosed techniques may spread out write backs in time, facilitate cache clean operations, facilitate thread switching, extend the time operands are available in an operand cache, and/or improve the use of compiler hints, in some embodiments.

20 Claims, 12 Drawing Sheets

(56) References Cited

U.S. PATENT DOCUMENTS

| | | | |
|---|---|---|---|
| 2015/0293853 A1* | 10/2015 | Yu ........................ | G06F 12/0864 711/137 |
| 2015/0324300 A1* | 11/2015 | Sampathkumar ... | G06F 12/0888 711/136 |
| 2016/0179548 A1* | 6/2016 | Ould-Ahmed-Vall ..................... | G06F 9/30018 712/205 |
| 2016/0179586 A1* | 6/2016 | Wang ...................... | G06F 9/528 711/125 |
| 2016/0246723 A1* | 8/2016 | Doshi .................. | G06F 12/0833 |

\* cited by examiner

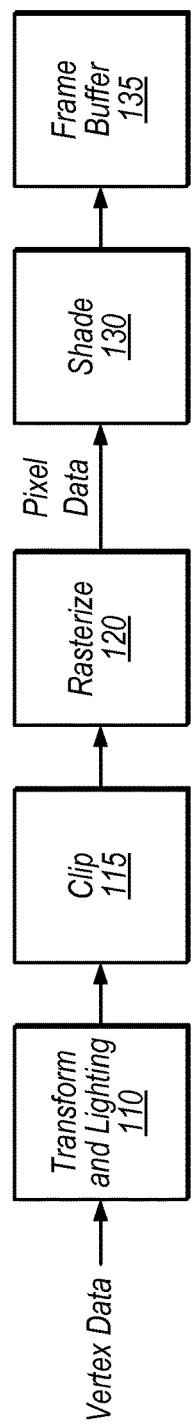
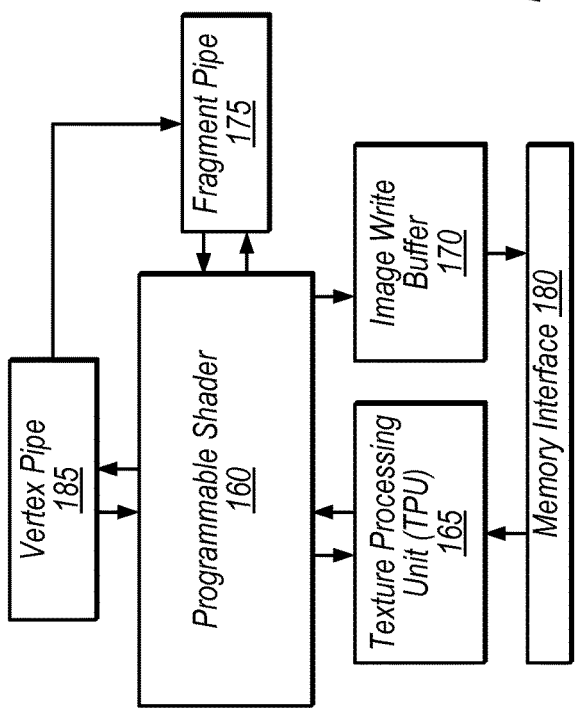
FIG. 1A
FIG. 1B

| | Operand Cache 215 | | | | | |
|---|---|---|---|---|---|---|
| | Operand Value 620 | Valid 622 | Dirty 623 | Tag Value 624 | Last Use 626 | Hint 628 |
| 0 | | | | | | |
| 1 | | | | | | |
| ⋮ | | | | | | |
| N-1 | | | | | | | ...

FIG. 6

OPERAND CACHE FLUSH, EVICTION, AND CLEAN TECHNIQUES USING HINT INFORMATION AND DIRTY INFORMATION

BACKGROUND

Graphics processing units (GPUs) are frequently used to operate on large amounts of data to generate frames of image data for display. The execution of GPU instructions may consume considerable power. GPUs are typically designed to allow a large amount of parallel execution. High power consumption may be problematic, particularly in mobile graphics applications in which a battery is used as a power source.

Graphics operands are often used multiple times in close succession. Using an operand cache between a register file and execution circuitry may reduce power consumption in accessing such operands, e.g., by avoiding multiple accesses to the register file. Managing an operand cache may be challenging, however, in implementations with features such as parallel execution, out-of-order execution, multi-threaded execution, independent control of execution units or groups of execution units, and/or clause-based execution, for example.

SUMMARY

Disclosed techniques relate to flushing operands from an operand cache, evicting entries from an operand cache, and performing cache clean operations. In some embodiments, the disclosed techniques may spread out write backs in time, facilitate cache clean operations, facilitate thread switching, extend the time operands are available in an operand cache, and/or improve the use of compiler hints, for example. In some embodiments, a GPU is configured to source all input operands from an operand cache and allocate an entry in the operand cache for all destination operands. This may reduce power consumption and datapath complexity, while resulting in new opportunities for operand cache control.

In some embodiments, a GPU is configured to control flushing of different dirty operand cache entries differently, based on their respective retention priorities. In some embodiments, the GPU is configured to pre-emptively write back dirty operand cache entries that have a low retention priority immediately, but not pre-emptively write back dirty operand cache entries that have a higher retention priority (instead, the GPU is configured to maintain these higher-priority entries until some subsequent event occurs, such as a need to invalidate an entry). In some embodiments, the GPU is configured to invalidate the pre-emptively flushed entries as soon as they are written back, while in other embodiments the GPU is configured to mark these entries as clean and retain the clean entries in case they are later accessed.

In some embodiments, a GPU is configured to select entries for eviction according to the following priority ordering: first, clean entries with a low retention priority, second, dirty entries with a higher retention priority (e.g., if clean entries with low retention priority are not found), then third, clean entries with the higher retention priority (e.g., if entries of the first two types are not found). In some embodiments, the GPU is configured to use a LRU or a second-chance approach to select among multiple entries of a particular category (e.g., if there are multiple clean entries with a low retention priority).

In some embodiments, a GPU is configured to perform an operand cache clean operation (e.g., by writing back and invalidating all valid dirty entries and invalidating all valid clean entries in an operand cache). In some embodiments, the GPU is configured to specify when a clean operation should occur at a per-instruction granularity, e.g., by indicating whether a clean should occur before or after the operand cache is updated based on a particular instruction.

BRIEF DESCRIPTION OF THE DRAWINGS

FIG. 1A is a block diagram illustrating one embodiment of a high-level graphics processing flow while FIG. 1B is a block diagram illustrating a graphics unit, according to some embodiments.

FIG. 6 is a diagram illustrating exemplary state information for an operand cache, according to some embodiments.

Figure 2:
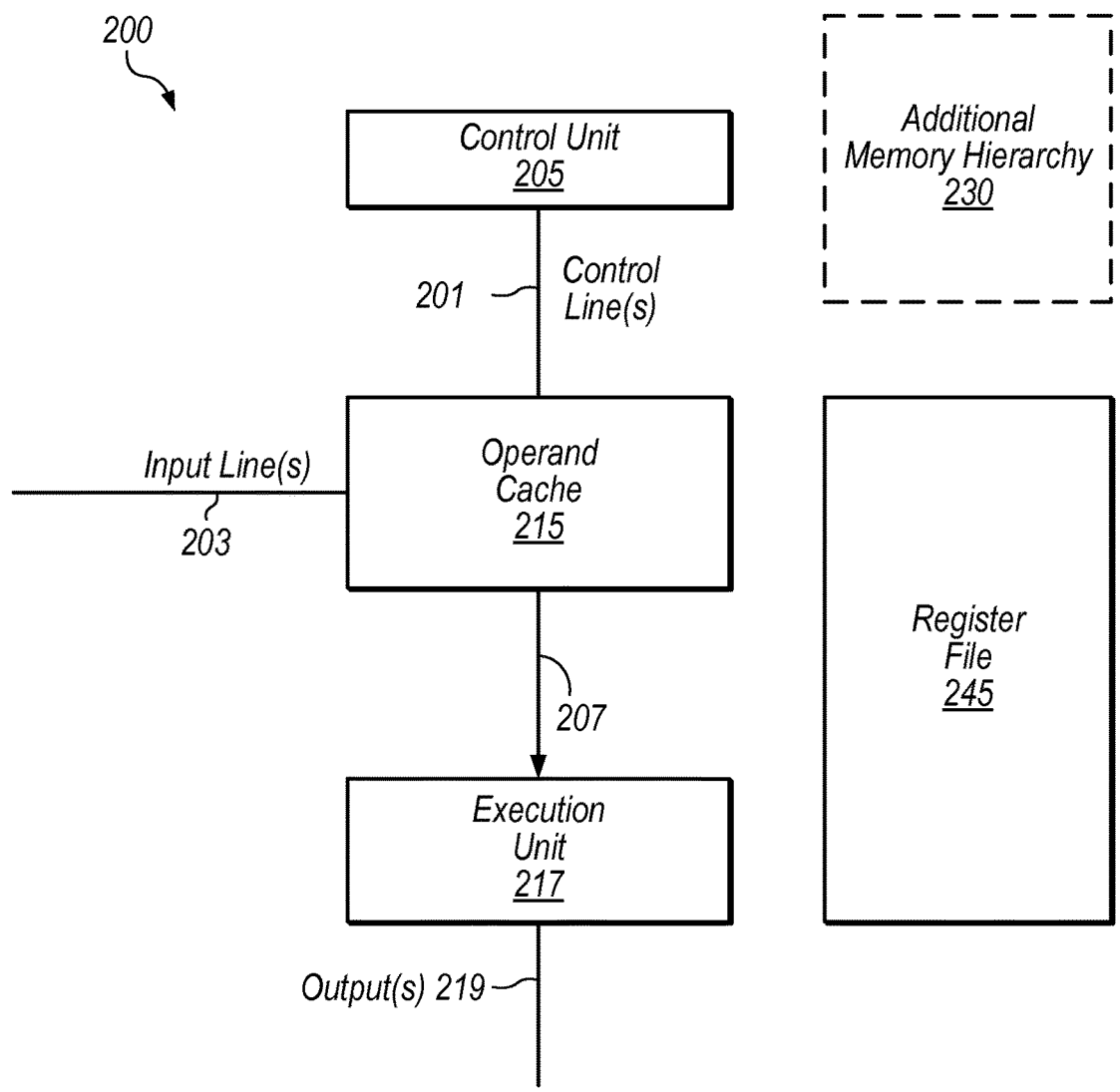
FIG. 2 is a block diagram illustrating an operand cache and associated structures, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to denote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

The terms "first," "second," etc., are used herein as labels for nouns that they precede unless otherwise noted, and do not imply any type of ordering (e.g., spatial, temporal, logical, etc.) unless indicated. For example, a "first" operand and a "second" operand can be used to refer to any two operands, and does not imply that one operand occurs before the other. In other words, "first" and "second" are descriptors.

"Based On" or "Based Upon." As used herein, these terms are used to describe one or more factors that affect a determination. This term does not foreclose additional factors that may affect a determination. That is, a determination may be solely based on the factor(s) stated or may be based on one or more factors in addition to the factor(s) stated. Consider the phrase "determining A based on B." While B may be a factor that affects the determination of A, such a phrase does not foreclose the determination of A from also being based on C. In other instances, however, A may be determined based solely on B.

DETAILED DESCRIPTION

This disclosure initially describes, with reference to FIGS. 1A-1B, an overview of a graphics processing flow and an exemplary graphics unit. Embodiments of a programmable shader that includes an operand cache are described with reference to FIGS. 2-6. Exemplary techniques for flushing operand cache data are discussed with reference to FIGS. 7 and 11. Exemplary techniques for eviction are discussed with reference to FIGS. 8 and 10. Exemplary techniques for operand cache clean operations are discussed with reference to FIGS. 9 and 12. An exemplary device is shown in FIG. 13.
Graphics Processing Overview Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write buffer 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.
Operand Cache Overview FIG. 2 is a block diagram 200 illustrating an operand cache 215 and associated structures, according to some embodiments. In some embodiments, one or more structures depicted in FIG. 2 are part of programmable shader 160, but may be located in other portions of a system (e.g., GPU, CPU, scalar and/or vector processing units, etc.) in various embodiments.

The system of FIG. 2 includes control unit 205, operand cache 215, execution unit 217, register file 245, and additional memory hierarchy 230. Control unit 205 is coupled to operand cache 215 via one or more control lines 201 in the embodiment shown. Control lines 201 may transmit control information to and/or receive control information from operand cache 215. Thus, control lines 201 may be used to effect control of reading from and/or writing to operand cache 215 in various embodiments. Additional control lines (not shown) may be used to control all or part of other structures (e.g., register file 245, memory hierarchy 230, etc.) in some embodiments.

In one embodiment, register file 245 is configured to store a plurality of operands for instructions to be executed by execution unit 217. Register file 245 may store operands for a large number (e.g., hundreds, thousands) of threads within a GPU in some embodiments. Thus, in the embodiment of FIG. 2, register file 245 may be implemented as a random access memory (RAM) array. Accordingly, in some embodiments, register file 245 is organized as two or more groups of memory banks, where each of the groups includes one or more memory banks that are configured to store operands. Access to register file 245 (e.g., to read an operand from a memory bank) may be slower and power-inefficient, in some embodiments, when compared to other types of structures that are capable of storing operands (e.g., smaller structures that are comprised of flops and/or latches, such as operand cache 215 in some embodiments). Further, bank conflict stalls may occur even in a multi-banked register file, in various embodiments.

Register file 245 may be a single-instruction, multiple data register file (e.g., a wide SIMD structure that is expensive to access in terms of power consumption) in some embodiments. For example, reading from register file 245 may require reading multiple operands in one embodiment. Thus, as described below, operand caching may be even more beneficial when register file 245 is a wide SIMD structure, in at least one embodiment.

In various embodiments, register file 245 may receive various data and/or control information from control unit 205, and operands from memory hierarchy 230. For example, in one embodiment, memory hierarchy 230 may transmit operands to register file 245, while control unit 205 transmits control information (although various configurations are possible, and control information and/or operands may be transmitted by other structures in some embodiments).

In the embodiment of FIG. 2, memory hierarchy 230 includes storage structures that may hold operand data (and/or other data, control information, etc.). Accordingly, in some embodiments, memory hierarchy 230 includes one or more of any or all of the following: L1 cache, L2 cache, L3 cache, additional register files and/or operand caches, storage devices such as flash memory, hard drives, static RAM devices, etc. Memory hierarchy 230 may include operands generated from various functional units (e.g., execution units, memory units, etc.) in different embodiments. In one embodiment, memory hierarchy 230 therefore includes one or more additional register files that are configured to provide operands to one or more additional operand caches and/or one or more additional execution units (not shown). These structures may be arranged in a hierarchy in various embodiments such that a deeper layer in the hierarchy will have more storage capacity, but slower access time. In one embodiment, there are be one or more separate register files that are not included in memory hierarchy 230, and that may be used in parallel with register file 245. Furthermore, memory hierarchy 230 is configured to interact with operand cache 215 in the embodiment of FIG. 2.

Operand cache 215 is configured to store one or more operands in the embodiment shown, and may help remedy issues associated with register file 245 (e.g., slow access, high power consumption, bank conflicts, etc.) in various embodiments. Operands stored by operand cache 215 may, in various embodiments, be a subset of operands that are stored elsewhere, such as register file 245 and/or additional memory hierarchy 230. Note that as used herein, the term "subset" refers to one or more of something, unless otherwise indicated. Thus, a "subset" of operands indicates one or more operands are being referred to.

In the embodiment shown, operand cache 215 is smaller in size than register file 245 (and is also smaller than various components of memory hierarchy 230). The smaller size of operand cache 215 may also allow operand cache 215 to consume less power than register file 245 when writing and/or reading an operand. Consider one example in which register file 245 is a 4 MB array of RAM, while operand cache 215 has storage for 32 operands. In such a scenario, it may take an appreciably less amount of time and/or power to access the operand cache vs. the register file. In one embodiment, operand cache 215 is configured to store 10% or less of the amount of operands that register file 245 is configured to store (though this percentage is non-limiting and may vary in other embodiments). In general, operand cache 215 may otherwise have one or more of the properties that one of skill in the art would associate with a cache, in various embodiments.

In the embodiment of FIG. 2, operand cache 215 is configured to receive operands via one or more input lines 203. Input lines 203 may be coupled to one or more data sources in various embodiments in order to receive operands. Data sources from which operands may be received on input lines 203 include register file 245, memory hierarchy 230, outputs of execution unit 217, and outputs of other processing elements, in one or more embodiments. Note that in FIG. 2, and in other figures generally, not all data and/or control paths are necessarily shown. Accordingly, additional communication and/or control pathways (e.g., between operand cache 215, register file 245, memory hierarchy 230, etc.) may be present in any drawing even if not otherwise indicated.

Note that in various embodiments, one or more operands may be stored simultaneously in operand cache 215, register file 245, or another data source (e.g., in memory hierarchy 230). That is, there may be two or more copies of an operand in more than one data structure in some embodiments. Various communication protocols such as cache-control protocols may be employed (e.g., via control unit 205) in such embodiments to ensure that multiple copies of operand values are consistent across different storage locations (e.g., by writing back modified data from operand cache 215, keeping track of a current value of a particular operand, etc.).

As shown, operand cache 215 is configured to provide one or more operands to execution unit 217 via one or more operand lines 207 (which may allow faster operand access time compared with register file 245 and/or memory hierarchy 230). Thus, operand cache 215 is configured to concurrently (e.g., in a same clock cycle or group of two or more clock cycles, depending on the embodiment) provide one or more operands to execution unit 217 via lines 207 in one embodiment. In various embodiments, operand cache 215 may concurrently provide any of various numbers of operands to execution unit 217—for example, in some embodiments, the number of operands that provided from operand cache 215 may depend on an instruction set architecture (ISA). Thus, with an ISA allowing up to four source operands for a given instruction, operand lines 207 may allow up to four operands to be concurrently transmitted to execution unit 217, for example.

Execution unit 217 is configured to execute instructions having an operator (e.g., multiply, add, multiply/add, etc.)

and various operands. Thus, execution unit 217 may receive operands from operand cache 215, register file 245, and/or other data structures and pathways (though operands received from register file 245 may be received more slowly and at a greater power cost, in some embodiments, when compared with operand cache 215). In some embodiments, execution unit 217 may be pipelined at various depths. After processing by execution unit 217, execution unit 217 is configured to send one or more results (i.e., operand results) via one or more data transmission pathways(outputs) 219 (which may be coupled to operand cache 215, register file 245, memory hierarchy 230, and/or other structures in various embodiments). In some scenarios, one or more operands may be concurrently forwarded from execution unit 217 to two or more other structures.

Still referring to the embodiment of FIG. 2, control unit 205 may transmit and/or receive one or more control signals (that indicate operands to be stored in operand cache 215 or to be provided to execution unit 217, for example). Thus, control unit 205 may control reading from and writing to operand cache 215. Control unit 205 may include various circuitry, and be distributed in various components and/or locations in one or more embodiments (e.g., a portion of control unit 205 may be located within operand cache 215, a decode unit, attached to one or more control signal or data pathways, etc.). All or a portion of control unit 205 may be located in operand cache 215, an execution pipeline of system 200, or any other element of system 200 that may be configured to communicate control signal(s) (such as an instruction decode unit), in one or more embodiments. In other words, control unit 205 is not limited to the location(s) shown in FIG. 2.

In other embodiments, control unit 205 may include an operand cache controller (not depicted) that controls operand cache 215. Such an operand cache controller in control unit 205 may indicate the tags and states (e.g., replacement state) of storage lines/entries; decide whether a cache hit or miss has occurred; and/or control when reads and writes to operand cache 215 occur. In one embodiment, operand cache 215 simply contains data storage, and in this embodiment, states, tags, and other information may be maintained by control unit 205 (for example, by an operand cache controller within control unit 205). Accordingly, in various embodiments, cache consistency, validity, dirty bits, tags, and/or other information regarding operand cache 215 may be maintained and updated by control unit 205.

Structures and techniques discussed with reference to FIG. 2, and generally with regard to other figures herein, may be adapted or configured for use in multi-threading environments in various embodiments. Multiple threads may operate in parallel, for example, during different clock cycles and/or during the same clock cycle using different hardware. In some embodiments, execution unit 217 performs computations for multiple threads that produce several operand results to be communicated via one or more transmission pathways 219.

Exemplary GPU Embodiments with Parallel and Clause-Based Execution

Figure 3:
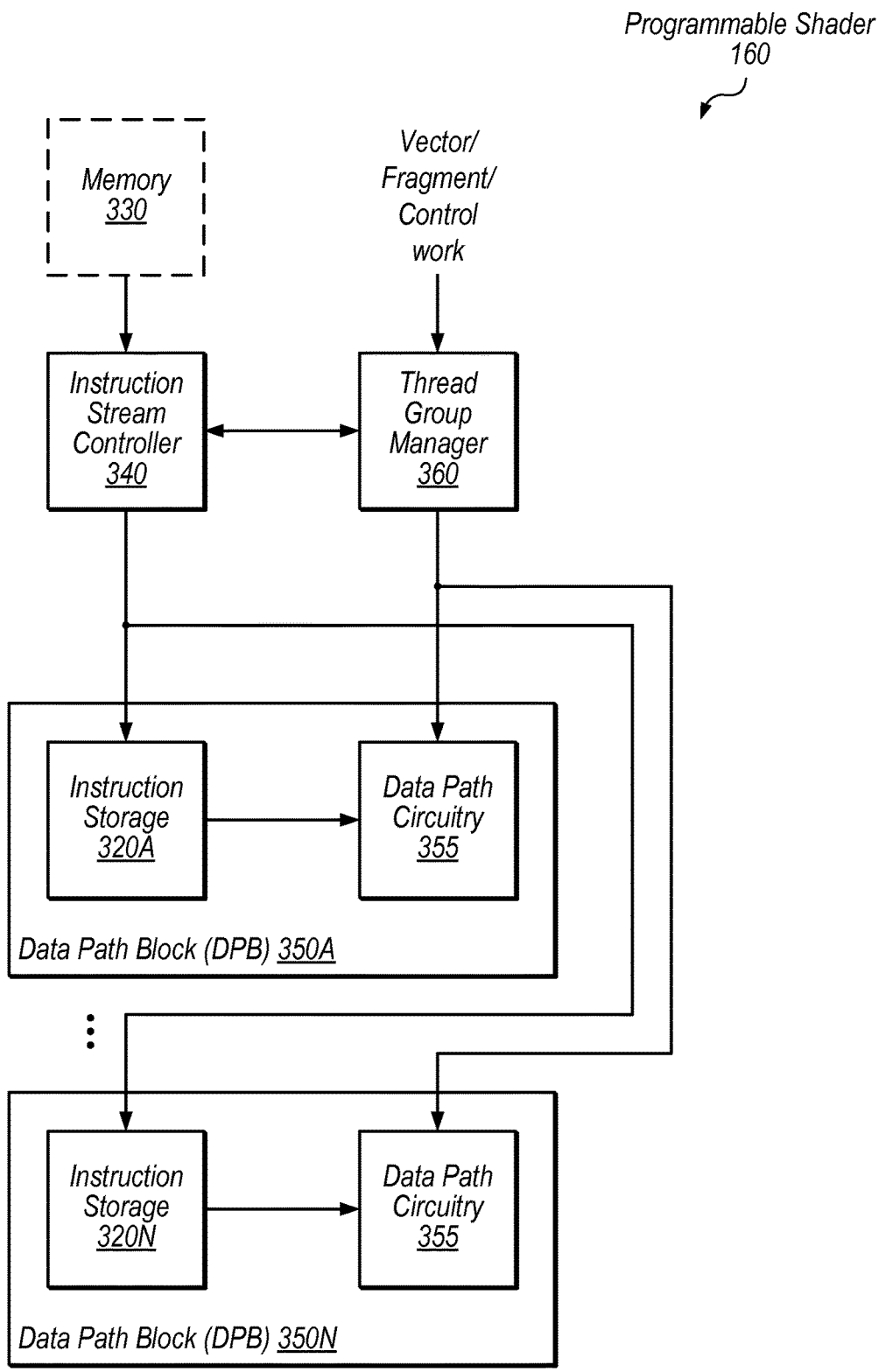
FIG. 3 is a block diagram illustrating processing elements included in a programmable shader, according to some embodiments.

FIG. 3 shows processing elements of a programmable shader 160, according to some embodiments. In the illustrated embodiment, programmable shader 160 includes instruction stream controller (ISC) 340, thread group manager (TGM) 360, and data path blocks (DPBs) 350A-N. In the illustrated embodiment, each DPB 350 includes instruction storage 320 and one or more data path circuitry blocks 355.

TGM 360, in some embodiments, is configured to receive and schedule the following types of work: vector work, fragment work, and/or control work. TGM 360 may receive such work from shader programs, for example, and break the work into clauses of instructions. In some embodiments, TGM 360 is a scheduler that maintains a smaller list of active threads from among a larger group of pending threads. TGM 360, in some embodiments, is configured to invoke clauses of instructions for execution in parallel by data path circuitry blocks 355 in DPBs 350.

As used herein, clause-based execution involves the ability to execute a plurality of instructions as a group (i.e., once a clause has been invoked for execution, all instructions in the clause are executed, barring an exception or other error). Clauses may include a single instruction, in some situations, but circuitry configured to perform clause-based execution must be able to handle clauses that include a plurality of instructions. Thus, in some embodiments, clauses may contain varying numbers of instructions from a single instruction to a maximum number of supported instructions.

Instruction stream controller 340, in some embodiments, is configured to group instructions into clauses and TGM 360 may assign the clauses to one or more sets of execution hardware for parallel execution. For example, a particular clause of M instructions may be assigned to a "SIMD group" or "thread group" (these terms are used interchangeably herein) to be executed using N execution modules in parallel (i.e., such that each of the M instructions is executed in parallel by N different execution modules using potentially different input data, e.g., for different pixels on a screen). Further, the same clause may be assigned to the same N execution modules multiple different times and/or also assigned for execution by one or more different groups of execution modules. In some embodiments, for a given clause of instructions, TGM 360 is configured to provide, to execution circuitry for parallel execution: a thread group ID, execution state information, and a pointer to relevant instructions (e.g., a pointer to the clause).

Instruction stream controller 340, in the illustrated embodiment, is configured to fetch instructions from memory 330 (which may or may not be included in the programmable shader), form them into clauses, and provide clauses of instructions to an instruction storage 320 in the appropriate DPB 350 for execution. In some embodiments, instruction stream controller 240 is configured to build streams of instructions, where a stream is a list of clauses for a given thread, and may be configured to cache streams of instructions. Instructions may be cached at multiple levels in a cache hierarchy, including instruction storage 320, in ISC 340 (not shown) and/or other levels in GPU 150. In some embodiments, instructions are cached at clause granularity at the DPB level and cached at stream granularity at one or more higher levels.

DPBs 350, in the illustrated embodiment, each include instruction storage 320 configured to store clauses of instructions and data path circuitry 355 configured to execute instruction clauses for different thread groups.

Figure 4:
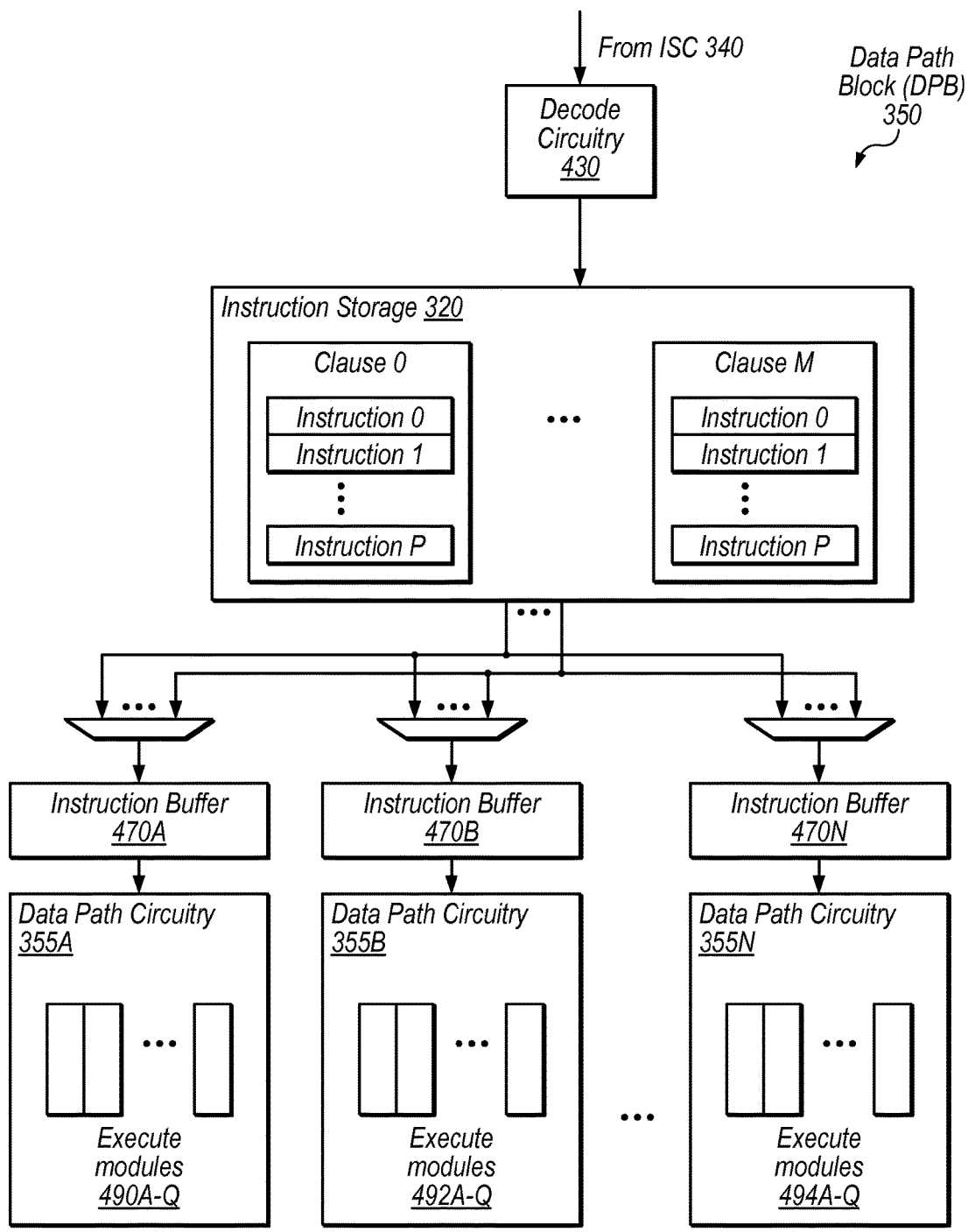
FIG. 4 is a block diagram illustrating processing elements included in a data path block that includes multiple data path circuitry elements, according to some embodiments.

FIG. 4 is a block diagram illustrating a DPB 350, according to some embodiments. In the illustrated embodiment, DPB 350 includes decode circuitry 430, instruction buffers 470A-N, and data path circuitry 355A-N. In the illustrated embodiment, each instance of data path circuitry 355 includes a plurality of execute modules 490A-Q, 492A-Q, and 494A-Q, which are each configured to execute a given instruction in parallel for different input data belonging to the same SIMD group.

Instruction storage 320, in the illustrated embodiment, includes multiple entries, each configured to store a set of instructions in the same clause. In these embodiments, the number of instructions included in a given clause may vary from a single instruction to the maximum number of instructions available in an entry of instruction storage 320. In different embodiments, instruction storage 320 may include storage for different numbers of clauses. Each entry configured to store clauses may include storage for the maximum number of instructions per clause (a design parameter which may vary in different embodiments). For example, instruction storage 320 may be configured to store two, four, eight, 16, etc. clauses of up to four, five, eight, sixteen, etc. instructions each. In some embodiments, instruction storage 320 may be indexed using a clause ID having an appropriate number of bits to uniquely identify each stored clause (e.g., 4 bits if instruction storage 320 is configured to store 16 clauses of instructions) and an instruction number having an appropriate number of bits to uniquely identify each instruction in a given clause (e.g., 4 bits if each clause is permitted to include up to 16 instructions). In some embodiments, the maximum number of clauses and the number of instructions per clause in instruction storage 320 may be configurable. For example, instruction storage 320 may operate in a first mode with four clauses of four instructions each, a second mode with eight clauses of two instructions each, etc.

In some embodiments, instruction storage 320 implements a large number of read ports to provide instructions to data path circuitry. For example, in some embodiments, instruction storage 320 includes two read ports for each instance of data path circuitry 355. In order to provide a sufficient number of read ports, the entries in instruction storage 320 are implemented using latches and/or flip-flops, in some embodiments. In some embodiments, instruction storage 320 is accessed by changing an address on one or more read multiplexers (not shown). In some embodiments, instruction storage 320 is the lowest level of instruction storage in a cache/memory hierarchy for storing instruction data (other higher levels may include one or more caches in ISC 340, memory 330, etc.). Storing instructions at the clause granularity, at the lowest level, may reduce power consumption by allowing clauses to be executed multiple times for different thread groups, in some embodiments.

Decode circuitry 430, in some embodiments, is configured to receive, from ISC 340, program instructions defined by a given instruction set architecture (ISA) and a clause ID for each instruction. In some embodiments, decode circuitry 430 is configured to receive one ISA instruction each cycle. In some embodiments, decode circuitry 430 is configured to maintain an instruction count state for each clause, in order to write decoded instructions to the correct location in a corresponding entry in instruction storage 320.

Instruction buffers 470A-N, in the illustrated embodiment, are configured to store instructions that have been read from instruction storage 320 for execution by their corresponding block of data path circuitry 355.

Data path circuitry instances 355A-N, in the illustrated embodiment, each include multiple execute modules 490A-Q, 492A-Q, or 494A-Q configured to perform instructions in parallel. Each execute module 490 may include one or more ALUs, floating-point units, shift units, etc. In some embodiments, each execute module 490 includes a 16-bit ALU while two or more execute modules in a given instance of data path circuitry 355 share one or more 32-bit ALUs. In the illustrated embodiment, single-instruction multiple-data (SIMD) execution is performed by executing the same instruction using from 1 to Q execute modules, where the different execute modules can use different input data (e.g., different input registers) for execution of the same instruction in parallel. In some embodiments, TGM 360 is configured to invoke clauses of instructions to operate on the data associated with thread group IDs, and the thread group IDs may identify the DPB 350 and data path circuitry 355 that will be used to execute the clause. In these embodiments, the size of SIMD groups corresponds to the number of threads that each execute module in each instance of data path circuitry 355 is configured to handle in parallel. In various embodiments, the value of integer may be 2, 4, 6, 8, 16, or any appropriate number and may be configurable. In some embodiments, each execute module 490 is associated with one or more operand caches.

Figure 5:
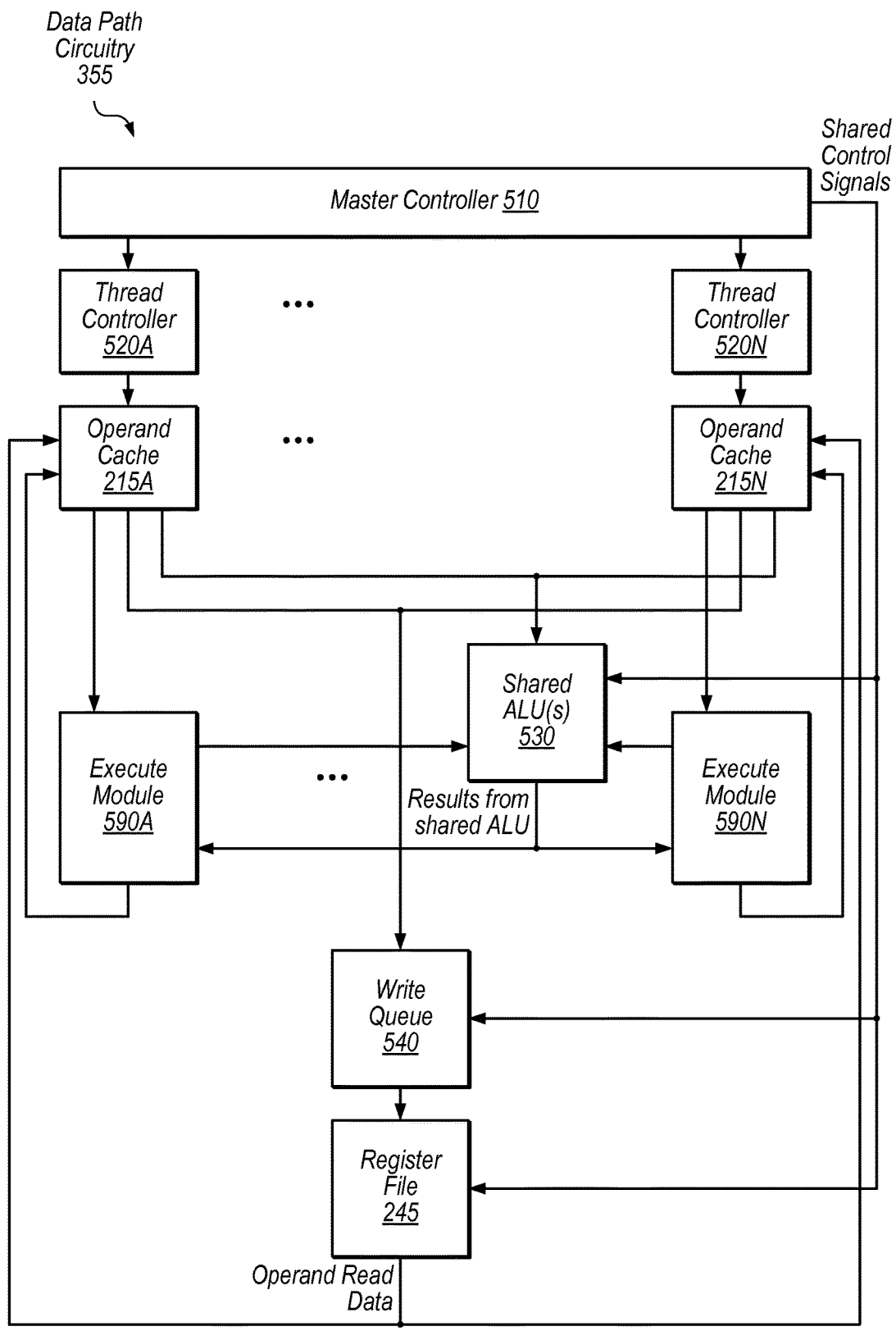
FIG. 5 is a block diagram illustrating data path circuitry that includes an operand cache, according to some embodiments.

FIG. 5 is a block diagram illustrating an instance of data path circuitry 355 that includes operand caches, according to some embodiments. In the illustrated embodiment, data path circuitry 355 includes master controller 510, thread controllers 520A-N, operand caches 215A-N, shared arithmetic logic unit(s) (ALUs) 530, execute modules 590A-N, write queue 540, and register file 245.

In some embodiments, instructions generally traverse through several major stages, including: operand cache allocation, source gathering, ALU execution, result write back, and instruction completion. In some embodiments, operand cache allocation and instruction completion must occur in program order while the other stages may occur out of program order.

Operand caches 215 may be configured as described above with reference to FIG. 2. In the illustrated embodiment, operand caches 215 are configured to provide operands to shared ALU(s) 530, execute modules 590, write queue 540 (e.g., for storage in register file 245), and/or other processing elements (not shown). In some embodiments, operand caches 215 are configured to receive operands (connections not explicitly shown) from register file 245, execute modules 590, shared ALU(s) 530, and/or other processing elements. In the illustrated embodiment, there is a one-to-one correspondence between operand caches and execute modules, but in other embodiments multiple operand caches may be implemented for a given execute module, e.g., to reduce operand cache access times. In some embodiments, only circuitry in a given instance of data path circuitry 355 can access its operand caches, so data must be flushed to register file 245 if it is needed by other processing elements.

Master controller 510, in the illustrated embodiment, is configured to receive thread groups to execute from TGM 360. In some embodiments, master controller 510 is configured to clean an operand cache 215 in response to executing a new thread group that is unrelated to a previous thread group being executed. Efficient performance of cache cleaning in terms of power consumption and area may be an important design goal.

In some embodiments, the number of operands that data path circuitry 355 is configured to flush from operand caches 215 to register file 245 in a given cycle (via write queue 540) is limited. Therefore, efficient flushing techniques to spread out flushes in time may be an important design goal. In some embodiments, master controller 510 is configured to arbitrate among flush requests from thread controllers 520 to allow flushes from operand caches 215 to the register file. When a thread controller 520 requests a flush for an entry, it may mark the entry as no longer eligible to be hit or cleaned. In some embodiments, master controller 510 is configured to maintain a list of operand cache entries for which flush requests have been received and the corresponding thread controllers for the operand caches that include the entries.

In some embodiments, master controller 510 is configured to indicate when a flush for a given operand cache entry is granted and/or completed. Data to be flushed may remain in an operand cache 215 until master controller 510 grants the flush. Once granted, operand cache 215 may then transmit the operand data directly to write queue 540 (rather than storing data to be flushed in an intermediate buffer). Once the data has been written, master controller 510 may indicate the completion to the appropriate thread controller 520, which may mark the entry as invalid.

In the illustrated embodiment, master controller is configured to provide control signals to the individual thread controllers as well as shared controller signals to shared ALU(s) 530, write queue 540, and register file 245.

Thread controllers 520, in the illustrated embodiment, are configured to monitor and control various information relating to the respective operand caches 215. In some embodiments, thread controllers 520 are configured to perform functionality described above with reference to the control unit 205 of FIG. 2. This may include handling entry allocation, entry eviction, cache clean operations, etc. In some embodiments, a thread controller 520 is configured to notify master controller 510 and/or TGM 260 when execution of a given clause is completed.

Execute modules 590, in some embodiments, are configured to perform 16-bit arithmetic while shared ALU(s) 530 are configured to perform 32-bit arithmetic. In other embodiments, these elements may perform operations of various widths, with shared ALU(s) 530 having a greater width than execute modules 590. Including one or more shared ALUs may reduce processor area while maintaining performance in situations where a relatively small number of 32-bit arithmetic instructions are executed. In other embodiments, data path circuitry 355 may not include shared ALUs. In some embodiments, execute modules 590 are configured similarly to execution unit 217 of FIG. 2. In some embodiments, each execute module 590 is configured to execute a SIMD group, and therefore may be configured to perform operations in parallel for multiple threads of a SIMD group at once. In these embodiments, the execute module is configured to perform the same operations for threads in the SIMD group. In some embodiments, individual control allows some hardware in an execute module 590 to be unused, e.g., when a SIMD group has a smaller number of threads than the execute module 590 is configured to support.

In the illustrated embodiment, results from execute modules 590 and shared ALU(s) 530 are written to operand caches 215 before eventually being written to write queue 540 and register file 245. In some embodiments, all result operands are written to an operand cache 215. This may reduce power consumption required for control signals, in some embodiments, relative to using separate control signals to indicate whether each result should be stored in an operand cache.

Write queue 540, in the illustrated embodiment, is configured to store operands to be written to register file 245. In embodiments in which registers are split into multiple portions and/or register file 245 includes multiple banks, write queue 540 may aggregate and control writes to register file 245 to reduce the overall number of required accesses and/or avoid bank conflicts when writing data to register file 245.

Register file 245 may be configured as described above with reference to FIG. 2, in some embodiments. Register file 245, in some embodiments, is configured to write all read operands to an operand cache 215 and is not configured to provide operands directly to execute modules 590. Thus, in some embodiments, all operand data for execute modules 590 is accessed through an operand cache, rather than directly from register file 245. In other embodiments (not shown), execute modules 590 may be configured to write at least some result operands directly to write queue 540 and/or register file 245 and register file 245 may be configured to provide at least some read operands directly the execute modules 590, without first storing these operands in an operand cache 215.

Exemplary Operand Cache State Information

FIG. 6 illustrates N exemplary operand cache entries (labeled 0 through N−1) and corresponding state information, according to some embodiments. Operand cache 215 may include various numbers of entries in various embodiments. In the illustrated embodiment, each entry is configured to store an operand value 620 (which may be one or more source operands, one or more result operands, or both), a valid field 622, a dirty field 623, a tag value 624, a last use field 626, and a hint field 628.

Operand value 620, in some embodiments, is configured to store data for multiple execution pipelines included in an execute module 590. For example, if execute module 590 includes N pipelines for parallel execution, operand value 620 may be configured to store up to N operands.

Valid field 622, in some embodiments, indicates whether a particular entry is valid. For example, if a valid bit is set to 0, then the entry is invalid (not in use) in some embodiments. In one embodiment, programmable shader 160 is configured to invalidate entries based on last-use data (e.g., an indication that an operand will not be used again). Invalid entries may be allocated to new operands, in some embodiments.

Dirty field 623 in some embodiments, indicates whether a particular operand cache entry is "dirty"—that is, whether that entry includes data that has been modified such that it is different than a corresponding higher-level memory element (e.g., has not yet been written back to a register file or other storage structure). If a cache entry is dirty, it may need to be written back prior to invalidation (freeing the entry), as will be understood by those with skill in the art. In some embodiments, validity and/or dirty information may be maintained for different portions of an entry. For example, in some embodiments each entry in operand cache 215 may contain multiple operand portions (high bits, low bits, etc.), each of which may have its own valid bit and dirty bit.

Tag values 624, in the illustrated embodiment, hold tag data that is usable to match an entry in operand cache 215 to a particular instruction, operand, and/or thread. For example, a given tag value 624 may contain information usable to determine that a corresponding operand value 620 corresponds to a particular source operand for a specific program instruction. In some embodiments, the tag value includes a logical address for an operand (e.g., the logical address of a register) and an identifier of the SIMD group that owns the entry. Tag values 324 may be implemented using various techniques known to those with skill in the art, in different embodiments.

In some embodiments, information depicted in operand cache 215 may be maintained (or have a separate copy maintained) in one or more other structures. In one embodiment, for example, tag values 624 are maintained in a separate structure in a decode unit or decode stage of an execution pipeline. Thus, in some embodiments, cache hits and cache misses into operand cache 215 are determined at instruction decode. Copies of operand values may likewise be stored in a register file or other structures (e.g., additional memory hierarchy). Operand cache 215 may also store additional information or include other features not depicted in the embodiment of FIG. 6.

As discussed above, operand caches may increase energy efficiency and/or reduce access times. Various techniques discussed below may be implemented in deciding how long to retain entries in operand cache 215, when to write back modified entries, and how to clean the operand cache (e.g., when switching between different threads). These techniques may further increase energy efficiency and/or reduce processor area associated with operand caches.

In some embodiments (not shown), programmable shader 160 is configured to source all input operands from operand cache 215 (and thus is not configured to source input operands directly from register file 245) and is configured to allocate an entry in operand cache 215 for every result destination, for a corresponding thread being executed by an execute module 590. This may reduce routing area requirements, reduce power consumption for control signals, etc. In these embodiments, although all operands are allocated an entry in an operand cache, certain entries may be quickly flushed or invalidated while other entries may be maintained for longer periods, based on various state information, such as last use field 626 and hint field 628, for example.

In some embodiments, hint field 628 is used to determine a retention priority for a given operand. In some embodiments, operands with low retention priority are generally evicted prior to eviction of operands with a higher retention priority. In some embodiments, hint field 628 is populated based on an instruction field in an instruction that specifies the corresponding operand associated with operand value 620. In some embodiments, hint information may not be part of an actual instruction, but instead be maintained as separate information associated with the instruction.

In some embodiments, for each source operand and destination operand of an instruction, that operand may have a corresponding hint value. For example, if an instruction format allows up to three source operands and one write operand, there may be four corresponding hint values. An instruction therefore might have the following hint value mapping:

Source operand 1: 0 (caching not suggested)
Source operand 2: 1 (caching suggested)
Source operand 3: 0 (caching not suggested)
Destination operand: 1 (caching suggested)

In this example, the second source operand and the destination operand for the instruction have a higher retention priority and the other source operands have a lower retention priority.

In some embodiments, one or more hint values 628 for an instruction may be determined by software (such as a compiler) based on one or more specified criteria. In response to such a determination, one or more hint values may be stored in an instruction stream that includes the corresponding instruction. Storing a hint value in an instruction stream may include, in various embodiments, storing the hint value in an instruction preamble, storing the hint value in an instruction encoding itself, or otherwise storing the hint value so as to be associated with a particular instruction (and/or that instruction's particular operands). Hint values stored in an instruction stream may be stored on computer-readable storage mediums in various embodiments.

In one embodiment, hint values are determined based on a first instruction and a second (possibly subsequent) instruction in an instruction stream that both use a first operand as a source operand. If a first instruction requires a particular operand, for example, and another instruction (possibly subsequent, i.e., later in program order) also requires the same particular operand, it may be beneficial to cache that operand so that the second instruction does not have to perform an expensive read from a register file. Instead, the second time that particular operand is needed, it may be inexpensively provided by an operand cache.

Another criterion that may be used in determining hint values, in some embodiments, is whether first and second instructions are within a certain distance of each other in program execution order. For example, if first and second instructions both require a particular operand, but there are a large number of intervening instructions that appear after the first instruction in program order and before the second instruction, it may not make sense to cache the particular operand, as the particular operand might have to reside in the operand cache for a long period of time before being accessed again. Accordingly, in some embodiments, one or more threshold closeness values may be used in order to determine whether a hint value should be used for a particular operand (e.g., caching may be suggested for a common operand in instructions that are only 2 or 4 instructions apart, but instructions that are hundreds of instructions apart may not have caching suggested via a hint bit, though determining whether to suggest caching via a hint value is not limited to these examples).

In yet another embodiment, another criterion that may be used in determining hint values is whether two or more instructions share a common operand with a first instruction. For example, because storage in an operand cache may be limited, in some scenarios, it may be advantageous to retain an operand that will be used again multiple times in the future (but perhaps not retain an operand that is only used once in the future). If only one storage element in an operand cache is available at a given time during program execution, for example, a compiler may choose to suggest retaining an operand that will be used the most number of times in the (near) future.

Generally, various cost functions may be assigned to any given operand indicating the value of caching that operand. Such a cost function may be used when determining retention priority. Cost functions may be globally calculated (e.g., during compile) and the most beneficial retention choices may then be encoded into hint bits. Some things that may enter into the cost function may include: whether the operand causes a bank conflict in the register file (if not retained), an estimate of the energy savings associated with retaining the operand (for example, a number of register file accesses expected to be saved), whether there is a need to cache an operand at all (e.g., an operand that is forwarded during its last-use does not need to be cached or written to the register file), a likelihood of the corresponding cache entry surviving to its use (e.g., if a thread is likely to be moved out of the execution pipeline prior to the use of the operand cache entry, then caching may not have a high value), and/or other factors. Furthermore, note that in order to calculate a cost function to determine if an operand should be cached, it may be useful in some embodiments to have: a compiler-predictable replacement algorithm for the operand cache (that is, the compiler may provide direct control of the operand cache by indicating that an entry should be replaced) and/or pipelining rules so that bank conflicts can be accurately predicted by the compiler. Hint field 628 may be used for both destination and source operands, in some embodiments.

Note that in some embodiments, hint values for an operand may optionally be ignored by hardware. That is, in such embodiments, hardware is not required (or guaranteed) to retain a particular operand, even if that operand has a hint value indicating a high retention priority. In the event that an operand is not retained, for example (even if it has a hint value indicating it should be), the operand will still be available from a register file (or other structure). Thus, in some embodiments, hint values may be viewed as suggestions to cache, not requirements, and in various embodiments, a cache miss on an operand cache simply means that an operand will have to be fetched from somewhere else.

Still referring to FIG. 6, an entry in operand cache 215 may maintain one or more last use values for an instruction. Last use field 626 may be used, in various embodiments, to indicate that a given operand will not be used again and may safely be discarded without writing the operand back to a storage structure (such as an operand cache or register file). During execution of instructions, for example, there may be a number of intermediate operands that are not final results (e.g., a final pixel value). Thus, when a given operand is indicated as being a "last-use", it need not be retained in an operand cache. Accordingly, in one embodiment, an apparatus (e.g., GPU) may be configured to not make any additional writes of an operand to an operand cache, register file, or other structure (e.g., memory hierarchy) in response to last-use values (which may be specified on a per-operand basis for both source and write operands, in various embodiments). Also note that last-use values for a particular operand may be used to invalidate a corresponding operand cache entry, in some embodiments.

Exemplary Flushing Techniques

Figure 7:
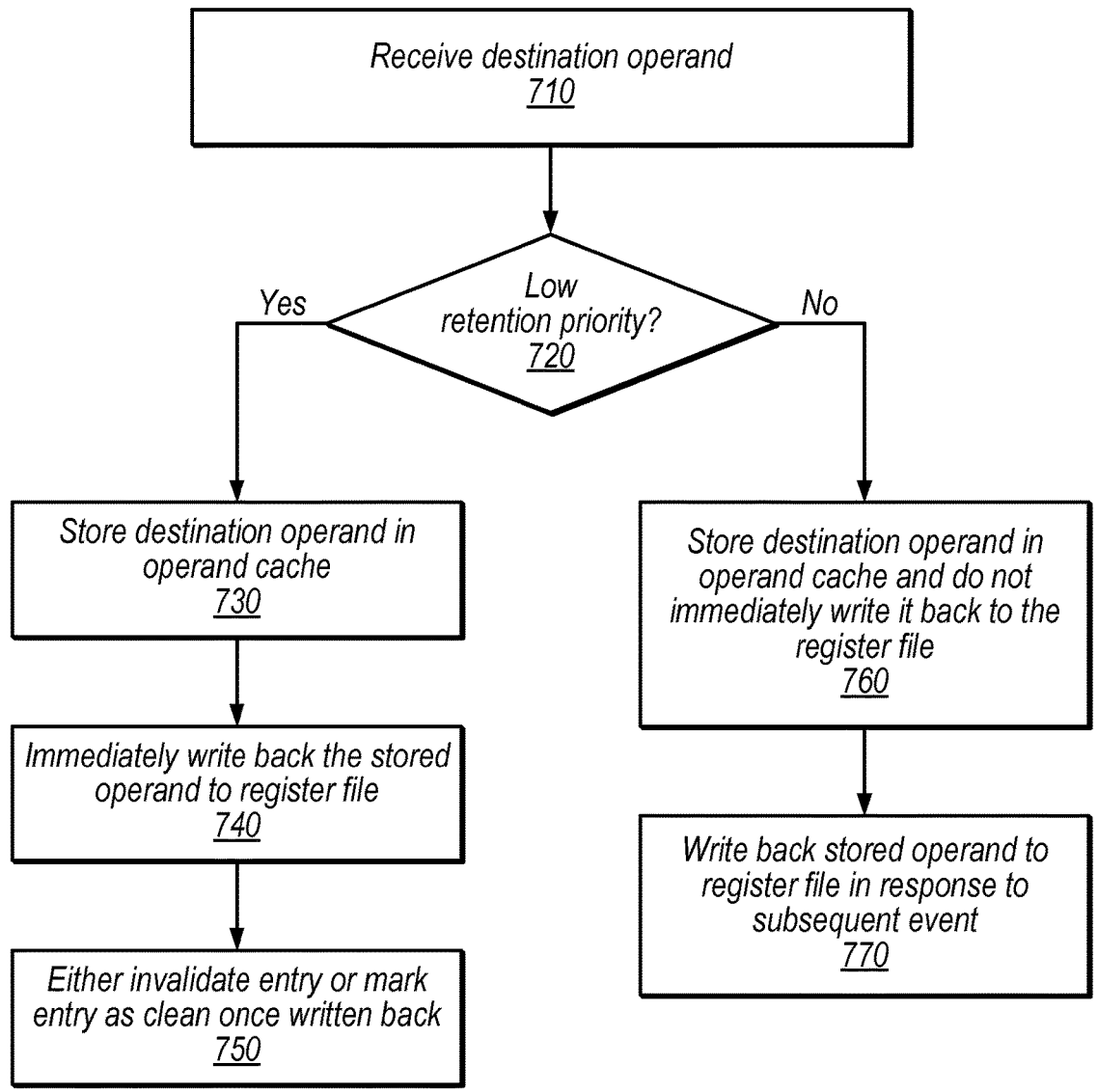
FIG. 7 is a flow diagram illustrating a method for flushing operand cache entries, according to some embodiments.

FIG. 7 is a flow diagram illustrating a method for flushing dirty entries, according to some embodiments. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 710.

At 710, operand cache 215 receives a destination operand. In some embodiments, thread controller 520 is configured to allocate an entry in operand cache 215 for destination operands regardless of their retention priority.

At 720, thread controller 520 determines the retention priority of the destination operand. If the retention priority is low, flow proceeds to 730. Otherwise, flow proceeds to 760. In some embodiments, retention priority is indicated using a single bit, indicating high or low retention priority. In other embodiments, multiple retention priorities may be defined.

At 730, the destination operand is stored in operand cache 215, e.g., by an execution module 590. Thread controller 520 may mark the corresponding entry as dirty. In some embodiments, hint field 628 is used to store the retention priority for the destination operand.

At 740, thread controller 520 immediately flushes (e.g., in the next clock cycle after storing the destination operand) the stored operand by writing it back to the register file based on the low retention priority. This pre-emptive flushing may spread out operand cache flushes in time, reducing future conflicts for flush bandwidth (e.g., on a thread switch), in some embodiments. Further, low-priority dirty entries may be relatively unlikely to be re-used.

At 750, thread controller 520 either invalidates the entry or marks the entry is clean once the operand has been written back. Marking the entry as clean may avoid a register file access in the event that another instruction accesses the operand. Invalidating the entry may free up the entry for use by other operands. In some embodiments, thread controller 520 is configured to either invalidate the entry or mark the entry as clean depending on other information, such as utilization of operand cache 215, for example.

At 760, the destination operand is stored in operand cache 215. Thread controller 520 may mark the corresponding entry as dirty. In this case, thread controller 520 does not immediately write the stored operand back to the register file. This may reduce register file accesses (e.g., in the event that the dirty operand is modified again, in which case a write back would have been wasted). It may also keep data with a higher retention priority in the cache.

At 770, the stored operand is written back to the register file in response to a subsequent event (e.g., based on a threshold number of entries in operand cache 215 being used, a cache clean operation, etc.).

In some embodiments, thread controller 520 is configured not to pre-emptively invalidate clean entries with a low retention priority. Even though these entries are unlikely to be used, they can easily be invalidated later, without having to flush dirty data.

Exemplary Eviction Techniques

Figure 8:
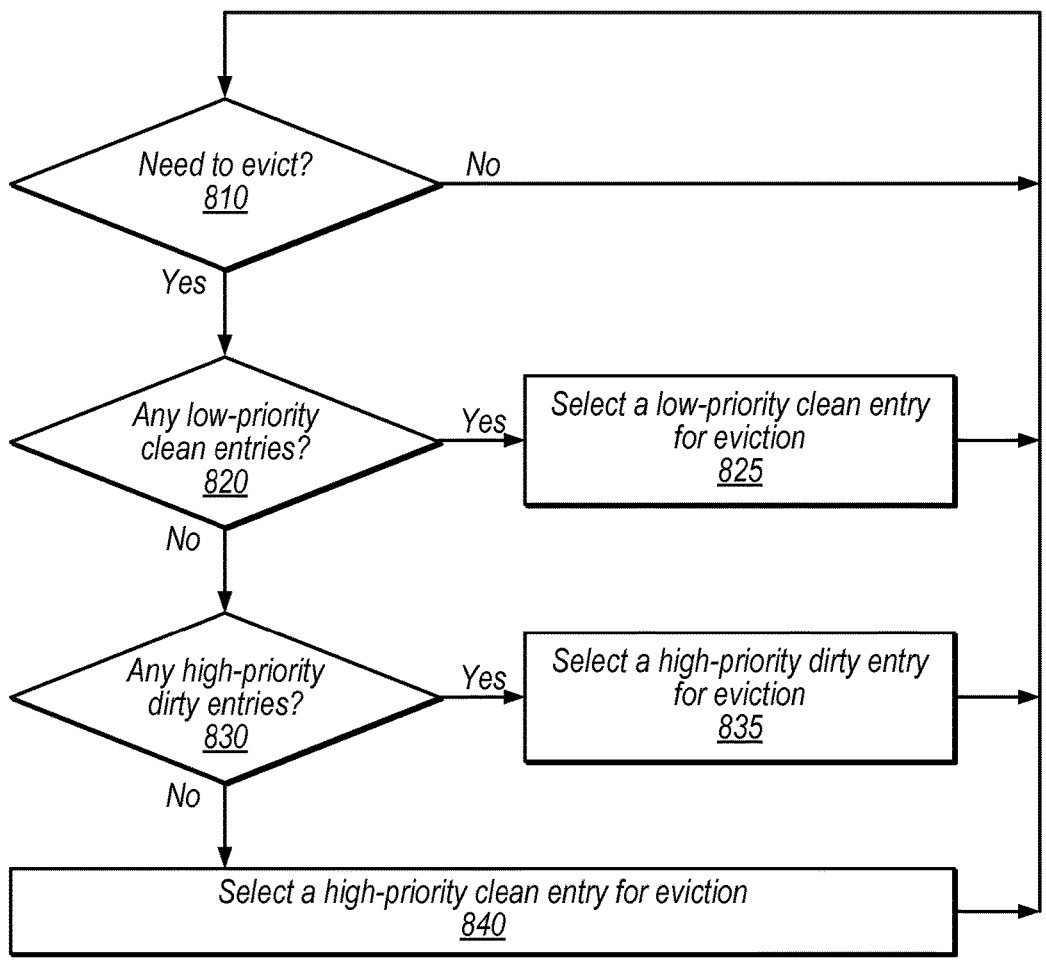
FIG. 8 is a flow diagram illustrating a method for evicting operand cache entries, according to some embodiments.

FIG. 8 is a flow diagram illustrating a method for selecting entries for eviction, according to some embodiments. The method shown in FIG. 8 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 810.

At 810, thread controller 520 determines whether an eviction from operand cache 215 is needed. In some embodiments, an eviction is needed if there are no entries in operand cache 215 that are currently invalid (or there are a smaller number of invalid entries than a number of entries that need to be allocated). If no eviction is needed, flow proceeds back to 810. Otherwise, flow proceeds to 820.

At 820, thread controller 520 determines whether there are any low-priority clean entries in operand cache 215. For example, in one embodiment, if a hint bit is not set and a dirty bit is not set for a valid entry, it is a clean entry with a low retention priority. If such an entry exists, flow proceeds to 825. At 825, a low-priority clean entry is selected for eviction. If there are multiple such entries, one of them may be selected using a least-recently-used approach, a second-chance approach, etc. Various LRU and second-chance approaches are well-known to those skilled in the art. In some embodiments, the selection scheme for selecting among the same category of entry is deterministic and/or predictable, to facilitate accurate compiler determination of hint information. Evicting low-priority clean entries first may be advantageous because these entries are unlikely to be accessed and are easy to evict (e.g., by simply invalidating the entry). If a low-priority clean entry does not exist, flow proceeds to 830.

At 830, thread controller 520 determines whether there are any high-priority dirty entries in operand cache 215. If such an entry exists, flow proceeds to 835. At 835 a high-priority dirty entry is selected for eviction. As discussed above with reference to method element 825, various selection schemes may be implemented for situations where multiple high-priority dirty entries exist. If a high-priority dirty entry does not exist, flow proceeds to 840.

At 840, a high-priority clean entry is selected for eviction. As discussed above with reference to method element 825, various selection schemes may be implemented for situations where multiple high-priority clean entries exist.

Selecting high-priority dirty entries for eviction before high-priority clean entries may spread out operand flushes in time, which may facilitate staying within flush bandwidth. Further, if an operand for an evicted dirty entry is needed, it may often be available in write queue 540, waiting to be written to register file 245. Thus, in some embodiments, if an operand is not available in operand cache 215 but is available in write queue 540, data path circuitry 355 is configured to access the operand from write queue 540 rather than accessing register file 245. Still further, the hint data may often be more accurate for source operands than for destination operands, so giving clean entries higher priority than dirty entries may improve the hit ratio in operand cache 215, in some embodiments.

Note that, in the illustrated example, low-priority dirty entries are not considered in the priority ordering. In some embodiments, this is because these entries are pre-emptively written back and become clean or invalid, as discussed above with reference to FIG. 7, and therefore need not be considered in the eviction priority scheme.

Exemplary Operand Cache Clean Techniques

Operand cache 215 may need to be cleaned in various situations, e.g., when a new instruction clause is to be executed for a different thread than a previous instruction clause. In this case, entries in operand cache 215 may generally not be useful for execution of the new thread. Thus, a clean operation may include invalidating clean entries and flushing and invalidating dirty entries in operand cache 215. In some embodiments, it may be desirable to perform the clean operation at the same time that operand cache 215 is receiving and storing new operands for an incoming thread. The beginning and end of a clause may typically be good places to perform a clean operation, but in some situations control of the timing of a clean operation may be desired at a finer granularity, e.g., on a per-instruction basis.

Figure 9:
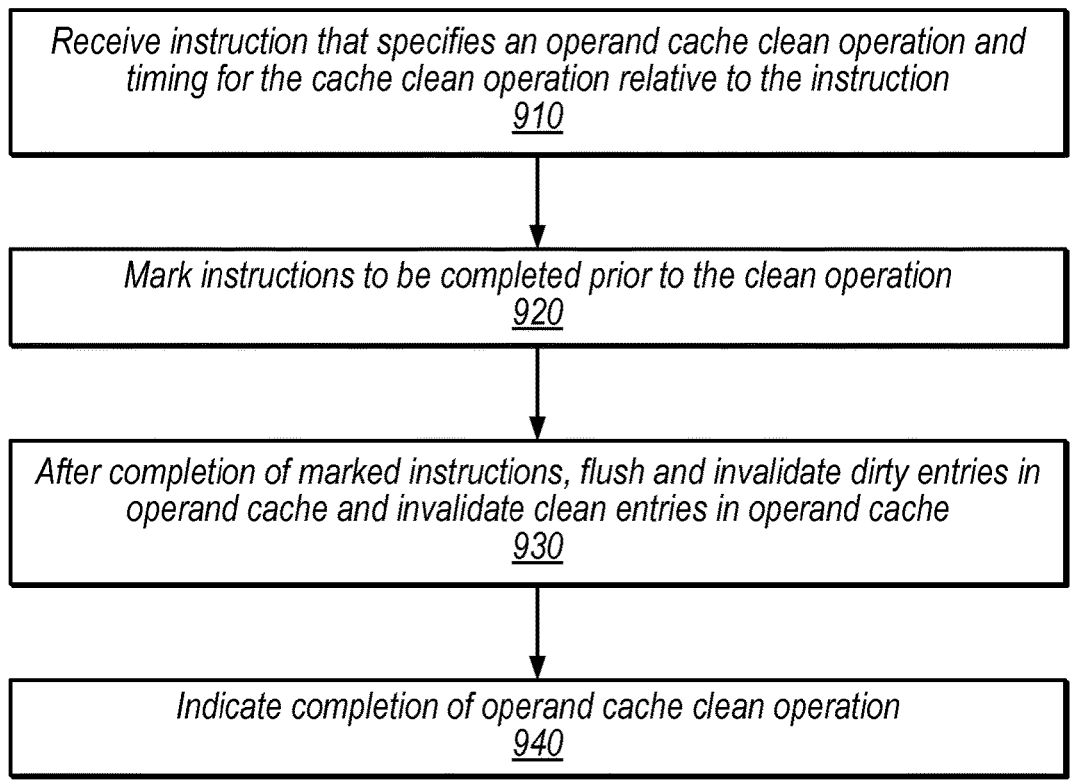
FIG. 9 is a flow diagram illustrating a method for performing an operand cache clean operation, according to some embodiments.

FIG. 9 is a flow diagram illustrating a method for cleaning an operand cache, according to some embodiments. The method shown in FIG. 9 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 910.

At 910, an instruction is received that specifies an operand cache clean operation and timing for the cache clean operation relative to the instruction. Note that the instruction may be one of various instructions (e.g., with various different opcodes) such that the nature of itself does not specify that an operand cache clean should occur (e.g., the instruction may specify some other operation), but one of more fields in the instruction may indicate that an operand cache clean should occur based on processing the instruction. In some embodiments, thread controller 520 receives the instruction from instruction buffer 470. In some embodiments, each entry in instruction buffer includes two bits, the first of which is set to indicate that a cache clean operation should occur before updating operand cache 215 based on the instruction and the second of which is set to indicate that a cache clean operation should occur after updating operand cache 215 based on the instruction. In other embodiments, only a single bit and/or additional timing information may be used. The timing information for the operand cache clean operation may be pre-generated by a compiler, may be generated by TGM 360 or ISC 340, or may be generated by some other processing element or software module. In some embodiments, master controller 510 is configured to generate the timing information.

At 920, thread controller 520 marks instructions to be completed prior to the clean operation. This may include any instructions that precede the instruction of method element 462 in program order and/or the instruction of method element 462 itself.

At 930, after completion of all marked instructions, thread controller flushes and invalidates all valid dirty entries in operand cache 215 and invalidates all valid clean entries in operand cache 215. This cache clean operation may be performed over multiple cycles, e.g., because of bandwidth limitations in flushing dirty operands and/or to wait for instructions to execute and write back their results to an operand cache 215. The techniques disclosed in FIGS. 7-8, however, may reduce the time needed to perform a cache clean, e.g., by spreading out flushes in time. Further, in some embodiments, subsequent instructions (e.g., instructions from another clause and/or thread) may begin populating invalidated entries of operand cache 215, such that new data is coming in as the old data is being cleaned, which may reduce the performance cost of thread switches.

At 940, thread controller 520 indicates that the clean operation is completed. Using timing information for cache clean operations at instruction granularity may allow more flexibility in coordinating these operations, e.g., between clauses of instructions and/or between threads, relative to specifying timing information at a higher granularity (e.g., per-clause). In other embodiments, however, timing information may be maintained at a higher granularity, e.g., to reduce the amount of storage used for such timing information.

Further Exemplary Embodiments

The following paragraphs set out embodiments of an apparatus configured to perform operand cache clean operations.

In some embodiments, an apparatus, includes: an execution unit; a register file configured to store operands for instructions to be executed by the execution unit; and an operand cache that includes a plurality of entries configured to store source operands from the register file and result operands of operations by the execution unit. In some embodiments, the apparatus is configured to perform a cache clean operation that includes invalidating clean entries in the operand cache and writing data for dirty entries in the operand cache to the register file. In some embodiments, the apparatus is configured to maintain, for an instruction to be executed by the execution unit, information indicating whether to perform a cache clean operation based on execution of the instruction and when to perform the cache clean operation relative to updating the operand cache based on the instruction.

In some embodiments, the apparatus is configured to mark, based on the information, instructions to be completed prior to the clean operation. In some embodiments, the apparatus is configured to perform the cache clean operation after completion of marked instructions. In some embodiments, the apparatus is configured to perform portions of the cache clean operations at different times, e.g., when corresponding marked instructions are completed. In some embodiments, the information indicates whether to perform the cache clean operation before or after updating the operand cache based on the instruction.

Figure 10:
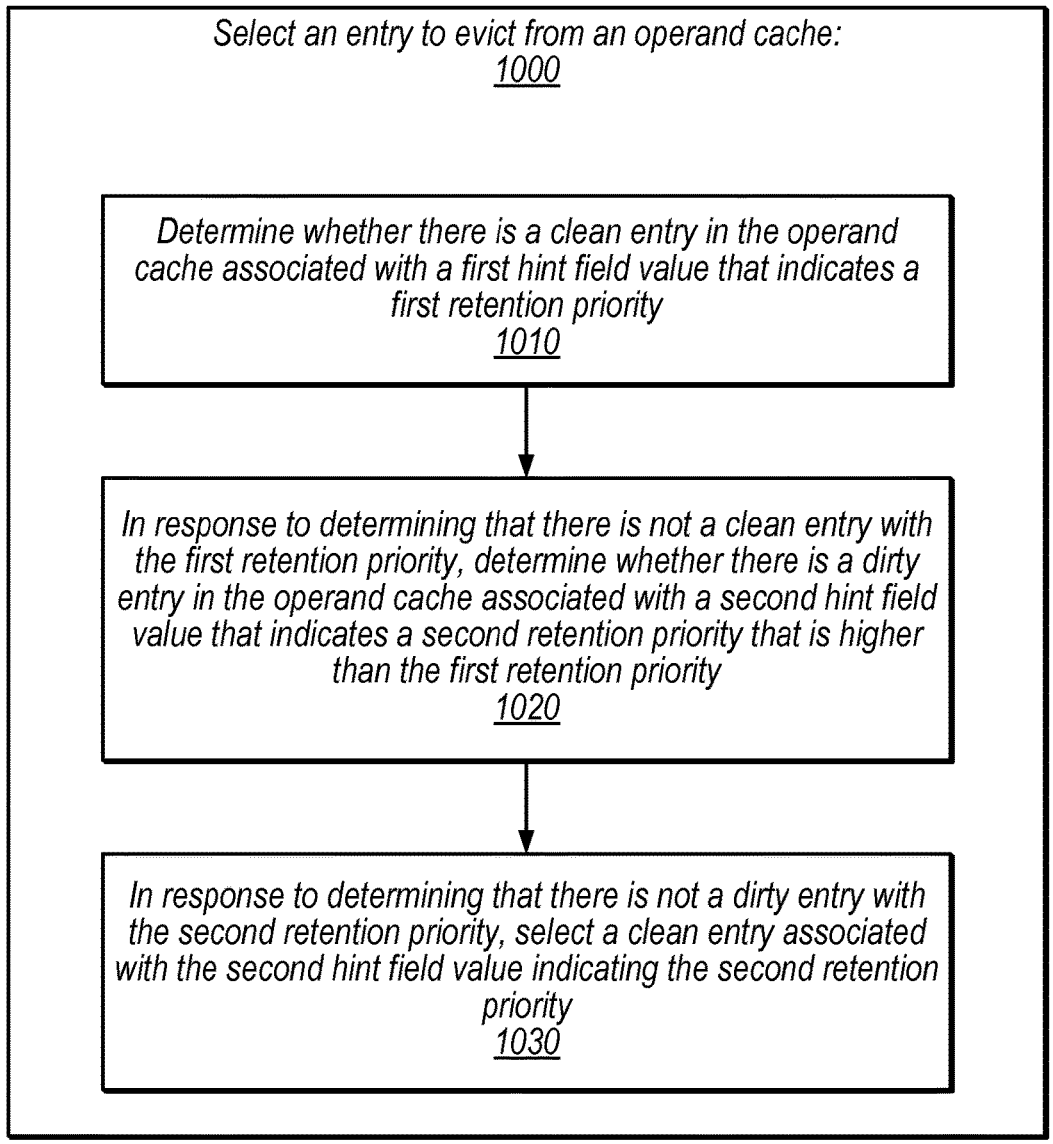
FIG. 10 is a flow diagram illustrating another method for selecting an operand cache entry to evict, according to some embodiments.

FIG. 10 is a flow diagram illustrating a method 1000 for selecting an entry to evict from an operand cache, according to some embodiments. The method shown in FIG. 10 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1010.

At 1010, it is determined whether there is a clean entry in the operand cache associated with a first hint field value that indicates a first retention priority. If such an entry is found, flow may end at 1010 and one or more such entries may be evicted.

At 1020, in response to determining that there is not a clean entry with the first retention priority, it is determined whether there is a dirty entry in the operand cache associated with a second hint field value that indicates a second retention priority that is higher than the first retention priority. If such an entry is found, flow may end at 1020 and one or more such entries may be evicted.

At 1030, in response to determining that there is not a dirty entry with the second retention priority, a clean entry is selected that is associated with the second hint field value indicating the second retention priority. In some embodiments, a clean entry associated with the higher retention priority may be selected only if no entries are found in steps 1010 and 1020.

In some embodiments, the selecting includes selecting from among a plurality of entries having the characteristics (e.g., from among multiple clean entries associated with the first retention priority or multiple dirty entries associated with the second retention priority) using a second priority policy such as a LRU policy or a second-chance policy, for example.

Figure 11:
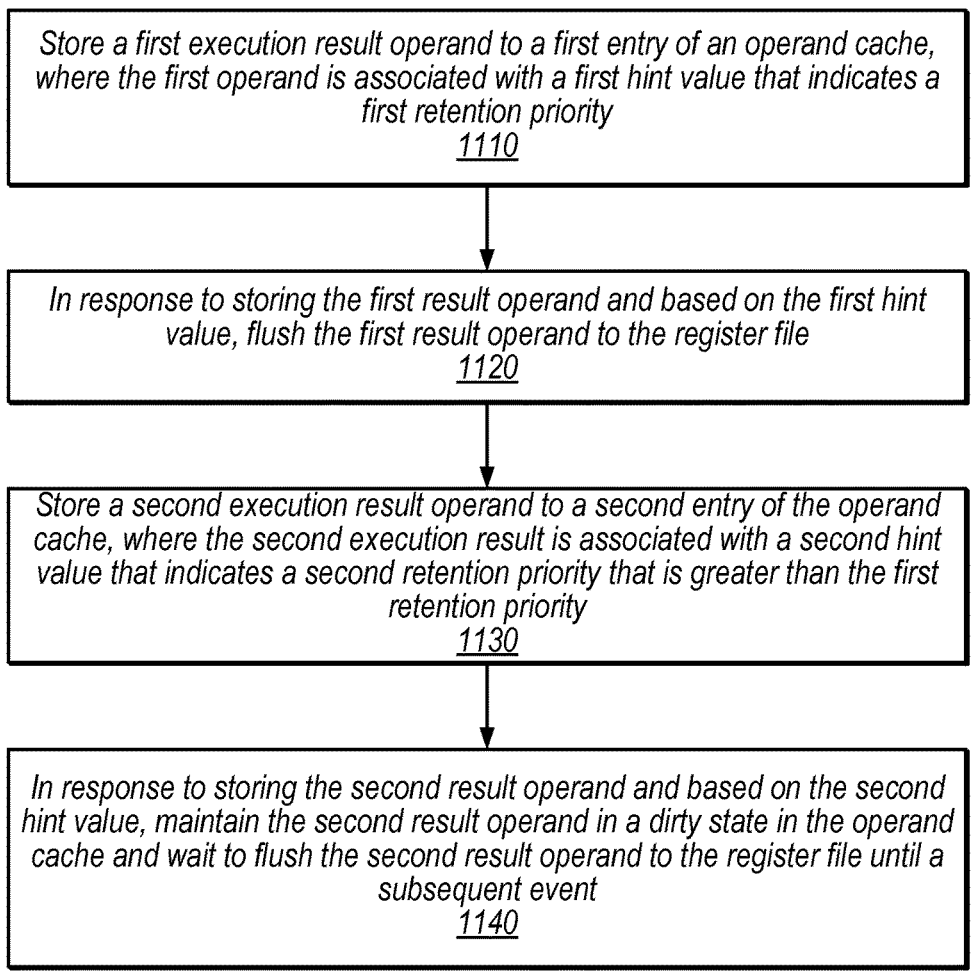
FIG. 11 is a flow diagram illustrating another method for flushing result operands, according to some embodiments.

FIG. 11 is a flow diagram illustrating a method for flushing dirty entries in an operand cache, according to some embodiments. The method shown in FIG. 11 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1110.

At 1110, in the illustrated embodiment, a first execution result operand is stored to a first entry of the operand cache, where the first result operand is associated with a first hint value that indicates a first retention priority.

At 1120, in the illustrated embodiment, in response to storing the first result operand and based on the first hint value, the first result operand is flushed to the register file.

At 1130, in the illustrated embodiment, a second execution result operand is stored to a second entry of the operand cache, where the second execution result is associated with a second hint value that indicates a second retention priority that is greater than the first retention priority.

At 1140, in the illustrated embodiment, in response to storing the second result operand and based on the second hint value, the second result operand is maintained in a dirty state in the operand cache and the GPU waits to flush the second result operand to the register file until a subsequent event.

Figure 12:
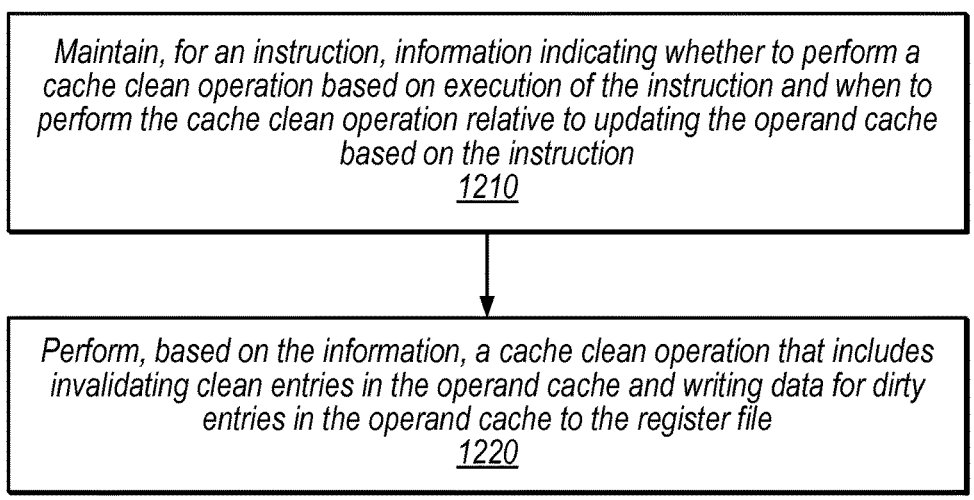
FIG. 12 is a flow diagram illustrating another method for performing a cache clean operation, according to some embodiments.
Figure 13:
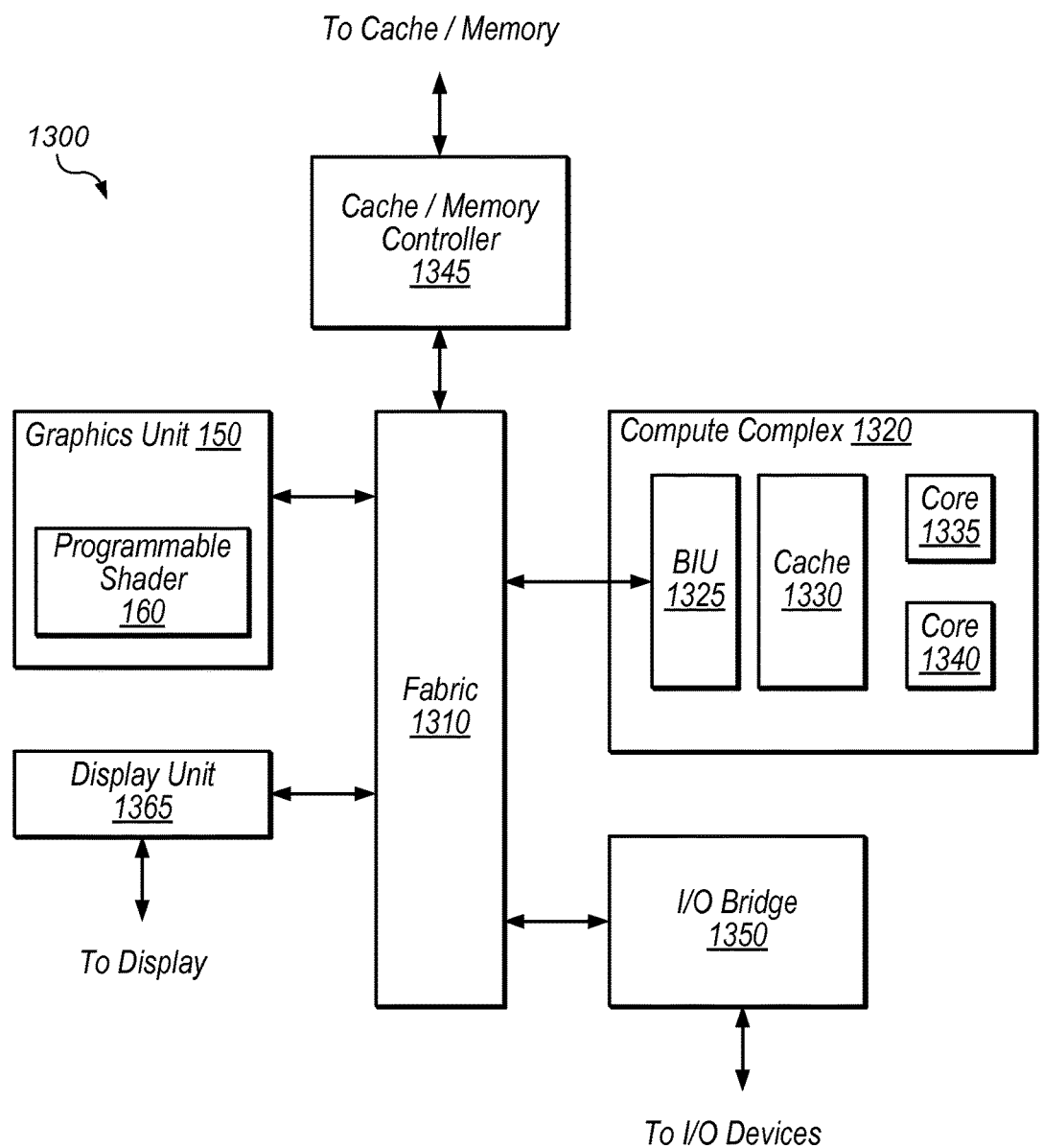
FIG. 13 is a block diagram illustrating one embodiment of a system that includes a graphics unit.

FIG. 12 is a flow diagram illustrating a method for performing a cache clean operation, according to some embodiments. The method shown in FIG. 12 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1210.

At 1210, in the illustrated embodiment, information is maintained for an instruction that indicates whether to perform a cache clean operation based on execution of the instruction and when to perform the cache clean operation relative to updating the operand cache based on the instruction.

At 2120, in the illustrated embodiment, a cache clean operation is performed based on the information. In this embodiment, the cache clean operation includes invalidating clean entries in the operand cache and writing data for dirty entries in the operand cache to the register file.

Exemplary Device and Computer-Readable Medium

In various embodiments, one or more aspects of the above-described techniques and methods may be implemented as computer-readable instructions stored on any suitable computer-readable storage medium. As used herein, the term computer-readable storage medium refers to a (nontransitory, tangible) medium that is readable by a computing device or computer system, and includes magnetic, optical, and solid-state storage media such as hard drives, optical disks, DVDs, volatile or nonvolatile RAM devices, holographic storage, programmable memory, etc. The term "non-transitory" as applied to computer-readable media herein is only intended to exclude from claim scope any subject matter that is deemed to be ineligible under 35 U.S.C. §101, such as transitory (intangible) media (e.g., carrier waves), and is not intended to exclude any subject matter otherwise considered to be statutory.

Referring now to FIG. 13, a block diagram illustrating an exemplary embodiment of a device 1300 is shown. In some embodiments, elements of device 1300 may be included within a system on a chip. In some embodiments, device 1300 may be included in a mobile device, which may be battery-powered. Therefore, power consumption by device 1300 may be an important design consideration. In the illustrated embodiment, device 1300 includes fabric 1310, compute complex 1320, input/output (I/O) bridge 1350, cache/memory controller 1345, graphics unit 150, and display unit 1365.

Fabric 1310 may include various interconnects, buses, MUX's, controllers, etc., and may be configured to facilitate communication between various elements of device 1300. In some embodiments, portions of fabric 1310 may be configured to implement various different communication protocols. In other embodiments, fabric 1310 may implement a single communication protocol and elements coupled to fabric 1310 may convert from the single communication protocol to other communication protocols internally.

In the illustrated embodiment, compute complex 1320 includes bus interface unit (BIU) 1325, cache 1330, and cores 1335 and 1340. In various embodiments, compute complex 1320 may include various numbers of processors, processor cores and/or caches. For example, compute complex 1320 may include 1, 2, or 4 processor cores, or any other suitable number. In one embodiment, cache 1330 is a set associative L2 cache. In some embodiments, cores 1335 and/or 1340 may include internal instruction and/or data caches. In some embodiments, a coherency unit (not shown) in fabric 1310, cache 1330, or elsewhere in device 1300 may be configured to maintain coherency between various caches of device 1300. BIU 1325 may be configured to manage communication between compute complex 1320 and other elements of device 1300. Processor cores such as cores 1335 and 1340 may be configured to execute instructions of a particular instruction set architecture (ISA) which may include operating system instructions and user application instructions.

Cache/memory controller 1345 may be configured to manage transfer of data between fabric 1310 and one or more caches and/or memories. For example, cache/memory controller 1345 may be coupled to an L3 cache, which may in turn be coupled to a system memory. In other embodiments, cache/memory controller 1345 may be directly coupled to a memory. In some embodiments, cache/memory controller 1345 may include one or more internal caches.

As used herein, the term "coupled to" may indicate one or more connections between elements, and a coupling may include intervening elements. For example, in FIG. 13, graphics unit 150 may be described as "coupled to" a memory through fabric 1310 and cache/memory controller 1345. In contrast, in the illustrated embodiment of FIG. 13, graphics unit 150 is "directly coupled" to fabric 1310 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 1365 may be configured to read data from a frame buffer and provide a stream of pixel values for display. Display unit 1365 may be configured as a display pipeline in some embodiments. Additionally, display unit 1365 may be configured to blend multiple frames to produce an output frame. Further, display unit 1365 may include one or more interfaces (e.g., MIPI® or embedded display port (eDP)) for coupling to a user display (e.g., a touchscreen or an external display).

I/O bridge 1350 may include various elements configured to implement: universal serial bus (USB) communications, security, audio, and/or low-power always-on functionality, for example. I/O bridge 1350 may also include interfaces such as pulse-width modulation (PWM), general-purpose input/output (GPIO), serial peripheral interface (SPI), and/or inter-integrated circuit (I2C), for example. Various types of peripherals and devices may be coupled to device 1300 via I/O bridge 1350.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    an execution unit;
    a register file configured to store operands for instructions to be executed by the execution unit; and
    an operand cache that includes a plurality of entries configured to store source operands from the register file and result operands of operations by the execution unit, wherein entries of the operand cache include fields that comprise at least:
        a hint field indicating a retention priority for the operand stored by the entry; and
        a dirty field indicating whether the operand stored by the entry has been modified;
    wherein the apparatus is configured to select an entry to evict from the operand cache according to the following priority order:
        select, at a first priority level, the entry from clean entries associated with a first hint field value that indicates a first retention priority;
        select, at a second priority level that is lower than the first priority level, the entry from dirty entries associated with a second hint field value that indicates a second retention priority that is higher than the first retention priority; and
        select, at a third priority level that is lower than the second priority level, the entry from clean entries associated with the second hint field value that indicates the second retention priority.

2. The apparatus of claim 1, wherein the apparatus is configured to select the entry at the second priority level only if no entries in the operand cache correspond to the first priority level and wherein the apparatus is configured to select the entry at the third priority level only if no entries in the operand cache correspond to the first priority level or the second priority level.

3. The apparatus of claim 1, wherein information indicating the retention priorities is stored in the hint field based on a compiler hint included in an instruction that specifies a corresponding operand.

4. The apparatus of claim 1, wherein the apparatus is configured to evict dirty entries by writing back an operand stored by the dirty entry to the register file and invalidating the dirty entry.

5. The apparatus of claim 1, wherein the apparatus is configured to store all source operands retrieved from the register file in the operand cache prior to providing the source operands to the execution unit.

6. The apparatus of claim 1, wherein the register file is a shared register file that is accessible to one or more other execution units of the apparatus and the operand cache is not accessible to the one or more other execution units.

7. The apparatus of claim 1, wherein the retention priority corresponding to an entry is determined based on:
whether multiple instructions in an instruction stream access a corresponding operand; and
a distance between the multiple instructions in the instruction stream.

8. A method, comprising:
selecting an entry to evict from an operand cache, wherein the operand cache includes a plurality of entries configured to store source operands from a register file and result operands of operations by an execution unit, wherein the operand cache includes fields corresponding to ones of the plurality of entries, including a hint field indicating a retention priority for the operand stored by the entry and a dirty field indicating whether the operand stored by the entry has been modified;
wherein the selecting includes:
determining whether there is a clean entry in the operand cache associated with a first hint field value that indicates a first retention priority;
in response to determining that there is not a clean entry with the first retention priority, determining whether there is a dirty entry in the operand cache associated with a second hint field value indicating a second retention priority that is higher than the first retention priority; and
in response to determining that there is not a dirty entry with the second retention priority, selecting a clean entry associated with the second hint field value indicating the second retention priority.

9. The method of claim 8, further comprising determining retention priorities for operands based on information in instructions that specifies the operands.

10. The method of claim 8, further comprising evicting the selected entry.

11. The method of claim 10, wherein the selected entry is a dirty entry and the evicting includes altering a valid field for the entry and writing back an operand stored in the entry to the register file.

12. The method of claim 8, further comprising determining that an eviction is needed based on a threshold number of entries in the operand cache being valid.

13. The method of claim 8, wherein the selecting includes selecting from among a plurality of entries having the same priority order according to a second priority policy.

14. The method of claim 13, wherein the second priority policy is a second chance policy.

15. An apparatus, comprising:
an execution unit;
a register file configured to store operands for instructions to be executed by the execution unit; and
an operand cache that includes a plurality of entries configured to store source operands from the register file and result operands of operations by the execution unit;
wherein the apparatus is configured to:
store a first execution result operand to a first entry of the operand cache, wherein the first result operand is associated with a first hint value that indicates a first retention priority;
in response to storing the first result operand and based on the first hint value, flush the first result operand to the register file;
store a second execution result operand to a second entry of the operand cache, wherein the second execution result operand is associated with a second hint value that indicates a second retention priority that is greater than the first retention priority; and
in response to storing the second result operand and based on the second hint value, maintain the second result operand in a dirty state in the operand cache and wait to flush the second result operand to the register file until a subsequent event.

16. The apparatus of claim 15, wherein the apparatus is further configured to:
invalidate the first entry in response to storing the first result operand and based on the first hint value;
store a source operand from the register file to a third entry of the operand cache, wherein the source operand is associated with the first hint value; and
maintain the source operand as a clean operand in the third entry until occurrence of a subsequent event.

17. The apparatus of claim 15, wherein the apparatus is configured to mark the first entry as clean after writing back the first result operand to the register file and maintain the first entry in a clean state and wait to invalidate the first entry until a subsequent event.

18. The apparatus of claim 17, wherein the subsequent event is an operand cache clean operation or detection of a threshold usage of the operand cache.

19. The apparatus of claim 17, further comprising using the stored first execution result operand as an input operand for a subsequent operation.

20. The apparatus of claim 15, wherein, to flush the first result operand to the register file, the apparatus is configured to:
maintain a list of flush requests;
store the first result operand in the operand cache until the flush of the first result operand is granted; and
in response to a grant of the flush of the first result operand, write the first result operand directly to the register file or to a write queue associated with the register file.

* * * * *